No. 800,186. PATENTED SEPT. 26, 1905.
G. W. VAUGHAN.
ICE BICYCLE.
APPLICATION FILED APR. 10, 1905.

Witnesses

George W. Vaughan,
Inventor,
by C. A. Snow & Co.
Attorneys

UNITED STATES PATENT OFFICE.

GEORGE W. VAUGHAN, OF LENOIR, NORTH CAROLINA.

ICE-BICYCLE.

No. 800,186.  Specification of Letters Patent.  Patented Sept. 26, 1905.

Application filed April 10, 1905. Serial No. 254,831.

*To all whom it may concern:*

Be it known that I, GEORGE W. VAUGHAN, a citizen of the United States, residing at Lenoir, in the county of Caldwell and State of North Carolina, have invented a new and useful Ice-Bicycle, of which the following is a specification.

This invention relates to traction-vehicles, and in particular to bicycles which are equipped to travel upon snow and ice, and has for its object to embody the invention in the nature of an attachment capable of being readily applied to any ordinary or common type of bicycle, so as enable the effective propelling of the latter over snow and ice by manipulation of the pedal-cranks in the usual manner. It is also proposed to enable the application of the attachment without any material change in the bicycle other than the removal of the wheels thereof, so as to permit of the mounting of the front and rear runners and the traction or drive wheel, which is to be driven from the pedal-crank shaft by the usual sprocket or beveled gear.

Another object of the invention is to effect adjustment of the drive-wheel so as to elevate the same out of contact with the snow or ice to permit coasting without rotation of the drive-wheel.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
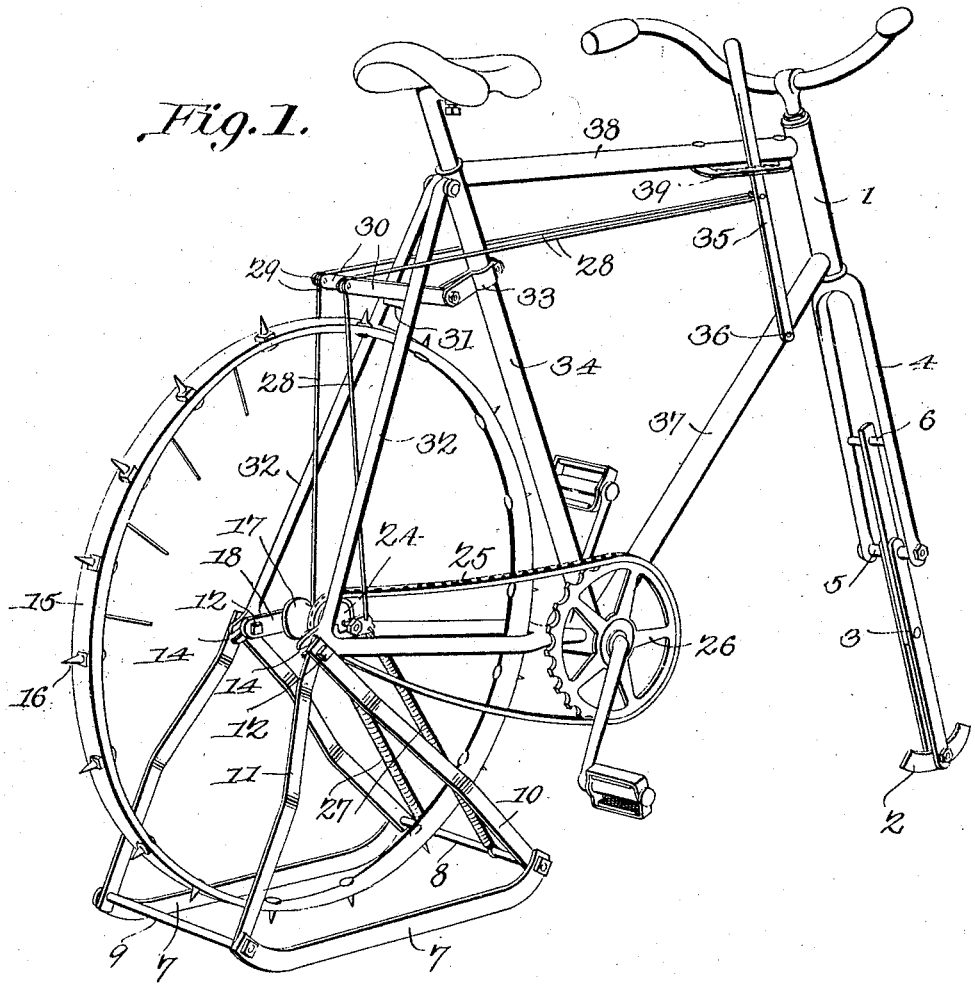
Figure 2:
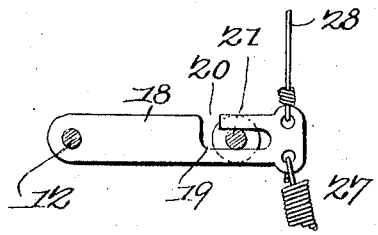
Figure 3:
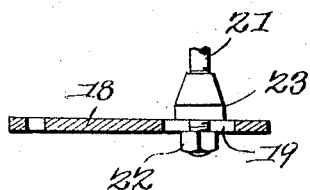

In the accompanying drawings, Figure 1 is a perspective view of a bicycle equipped with the attachment of the present invention. Fig. 2 is a detail view illustrating the manner of mounting the traction or drive wheel. Fig. 3 is a longitudinal sectional view of Fig. 2.

Like characters of reference designate corresponding parts in each and every figure of the drawings.

In setting forth the present invention there has been represented in the accompanying drawings the frame 1 of an ordinary bicycle, from which the front and rear wheels have been removed. In the place of the front wheel there is a runner 2, which is carried by the lower end of a standard 3, having its upper end portion received between the members of the front fork 4 of the bicycle and secured thereto by means of a lower cross-bar 5, piercing the standard and secured within the openings in the lower end of the fork for the usual reception of the axle of the front wheel, there being another cross-bar 6 piercing the upper extremity of the standard and the sides of the fork. For the support of the rear portion of the bicycle there is a rear runner made up of parallel runner members 7, which have their extremities upturned and connected by front and rear cross-bars 8 and 9. From the opposite ends of each runner rise standard members 10 and 11, which converge upwardly and have their upper crossed ends pierced by a fastening 12, which also engages the bearing-slot 14 in the adjacent member of the rear fork of the bicycle-frame, which ordinarily receives the axle of the rear wheel. The runner members 7 are of course spaced a suitable distance apart to insure the stable support of the device, and from a point about midway of the lengths of the standards 11 the latter are inclined inwardly to the respective rear fork members of the bicycle-frame.

In lieu of the usual rear wheel of the bicycle there is a spiked wheel 15, which may be an ordinary bicycle-wheel with the tire removed therefrom, and having spikes or prongs 16 piercing the rim and projected at the exterior thereof for successive engagement with the snow or ice. As the bearing-slots 14 of the rear fork are occupied by the fastenings 12 of the rear runner it is necessary to provide other means of support for the hub 17 of the wheel, and therefore I provide a pair of bearing-links 18, located within the rear fork of the bicycle-frame and pierced by the respective fastenings 12, from which the links extend forwardly and are capable of swinging vertically. Each link 18 is provided with a longitudinal slot 19 and a transverse entrance-slot 20, intersecting the top edge of the link and the slot 19, whereby the axle 21 of the hub may be readily entered into the slot and held therein by means of a nut 22, fitted to the outer projected end of the axle and clamping the link between the nut and the usual fixed bearing-cone 23, carried by the axle. The hub of the wheel of course has the sprocket 24 thereon, and the usual sprocket-chain 25 extends between this sprocket and the usual drive-sprocket 26 of the bicycle, whereby the traction-wheel 15 may be driven by the usual manipulation of the ordinary pedal-crank, As the traction-wheel is mounted in vertically-yieldable bearings it is proposed to provide for holding the traction-wheel down in positive engagement with the snow or ice, and this is accomplished by a tension device, consisting of a pair of helical springs 27, connected to the front cross-bar 8 of the runners 7 and the forward ends of the respective bearing-links 18.

To enable coasting without removing the feet from the pedals, means is provided for lifting or elevating the traction-wheel against the tension of the springs 27 out of engagement with the snow or ice, consisting of flexible elements 28, secured to the front free ends of the respective links 18 and rising therefrom to a point above the top of the traction-wheel, where they engage guides in the nature of pulleys 29, carried by supporting-arms 30, which rest intermediate of their ends upon the cross-bar 31, which ordinarily connects the upper portions of the braces or upper rear fork members 32, the forward ends of the arms being connected to a clip or bracket 33, suitably secured to the seat-post tube 34. At their forward ends the flexible connections 28 are connected to an intermediate portion of an upstanding lever 35, fulcrumed at its lower end, as at 36, upon the lower reach-bar 37 of the bicycle-frame, with its upper end formed into a handle rising above the upper reach-bar 38 so as to be in position for convenient access by the rider to elevate the traction-wheel by pushing the lever forward, there being a suitable rack 39, carried by the reach-bar 38, for engagement by the lever 35 to hold the same at any point of adjustment. It will of course be understood that the vertical movement of the traction-wheel 15 is comparatively slight, and therefore the usual slack in the drive-chain 25 will permit of the necessary vertical movement to enable the engagement and disengagement of the traction-wheel with respect to the snow or ice.

From the foregoing description it is apparent that the attachment of the present invention is embodied in simple and useful form capable of being conveniently fitted to the ordinary diamond-frame type of bicycle without making any alterations therein, it being necessary merely to remove the front and rear wheels to enable the fitting of the front and rear runners and the traction-wheel. When the attachment is fitted in place, no additional weight is added to the bicycle nor is the usual manipulation thereof interfered with. Moreover, the traction-wheel may be lifted out of engagement with the snow or ice to enable coasting without removing the feet from the pedals, and the drive-wheel is always under the control of the rider through the medium of the pedals and the lever 35.

As there is no material change in the frame of the bicycle, the latter may be readily converted from one form to the other without requiring any particular degree of skill or experience.

Having fully described the invention, what is claimed is—

1. The combination with a frame, of a traction-wheel mounted to yield vertically thereon, runners located at opposite sides of the wheel, bars connecting the runners, standards connecting the runners to the frame, and a spring connected to one of the cross-bars to yieldably hold the traction-wheel down in engagement with the roadway.

2. A bicycle attachment comprising substantially parallel runner-bars, cross-bars connecting the same, standards rising from the front and rear ends of each runner member and converged upwardly to a common point, fastenings piercing each pair of standards at their points of crossing, swinging links supported upon the fastenings, a traction-wheel mounted upon the links with its hub provided with a gear, a tension device connected to the links and one of the cross-bars of the runners, a bracket for connection with a bicycle-frame, a lever to be fulcrumed upon the frame, a guide carried by the bracket, and flexible connections for engagement with the links, the guide and the lever.

3. A bicycle attachment comprising a pair of substantially parallel runners, standards rising from the runners, fastening devices carried by the standards for connection with a bicycle-frame, vertically-swinging links mounted upon the fastenings and provided in their upper edges with corresponding substantially L-shaped slots, a traction-wheel provided with an axle received within the slots of the links, nuts carried by the axle to clamp the latter in the slots, and a tension device operating upon the links to yieldably force the latter downwardly.

4. A bicycle attachment comprising a pair of substantially parallel runners, upwardly-converged standards rising from each runner, fastenings piercing the respective pairs of standards at their points of crossing for connection with a bicycle-frame, vertically-swinging links mounted upon the fastenings, a traction-wheel mounted upon the links, a cross-bar connecting the runners, and a tension device extending between the cross-bar and the links.

In testimony that I claim the foregoing as my own I have hereto affixed my signature in the presence of two witnesses.

GEO. W. VAUGHAN.

Witnesses:
  J. D. MATHESON,
  J. C. SEAGLE.